United States Patent
Salama

(10) Patent No.: US 10,043,337 B2
(45) Date of Patent: Aug. 7, 2018

(54) SINGLE SPACE ELECTRONIC PARKING METER WITH METER HOUSING MOUNTED VEHICLE SENSOR

(71) Applicant: Duncan Parking Technologies, Inc., Milwaukee, WI (US)

(72) Inventor: Asaf Salama, Mequon, WI (US)

(73) Assignee: DUNCAN PARKING TECHNOLOGIES, INC., Milwaukee, WI (US)

(*) Notice: Subject to any disclaimer, the term of this patent is extended or adjusted under 35 U.S.C. 154(b) by 1102 days.

(21) Appl. No.: 14/155,062

(22) Filed: Jan. 14, 2014

(65) Prior Publication Data
US 2015/0106172 A1    Apr. 16, 2015

Related U.S. Application Data

(60) Provisional application No. 61/890,955, filed on Oct. 15, 2013.

(51) Int. Cl.
G07F 17/24    (2006.01)
G06Q 30/02    (2012.01)
(Continued)

(52) U.S. Cl.
CPC ....... *G07F 17/246* (2013.01); *G06Q 30/0284* (2013.01); *G07B 15/02* (2013.01);
(Continued)

(58) Field of Classification Search
None
See application file for complete search history.

(56) References Cited

U.S. PATENT DOCUMENTS 2,483,805 A    10/1949    Broussard et al.
2,495,784 A    1/1950    Starts
(Continued)

FOREIGN PATENT DOCUMENTS

JP    08-305998    11/1996
JP    2011-060206    3/2011
(Continued)

OTHER PUBLICATIONS

U.S. Appl. No. 13/551,181, filed Jul. 17, 2012, Jones et al.
(Continued)

*Primary Examiner* — Firmin Backer
*Assistant Examiner* — Jerold Murphy
(74) *Attorney, Agent, or Firm* — Hunton Andrews Kurth LLP

(57) ABSTRACT

An upper parking meter outer housing component that includes a parking meter cap is provided. The parking meter cap includes an outer surface, an inner surface defining an interior cavity, and a lower edge portion defining an opening into the interior cavity. The lower edge portion is configured to be coupled to a lower housing component of single space meter such that a meter mechanism may be enclosed within the interior cavity of the upper meter dome. The meter cap includes a vehicle sensor coupled to the inner surface of the upper meter dome. The meter cap includes a solar panel coupled to the inner surface of the upper meter dome and configured to supply power to the vehicle sensor.

16 Claims, 12 Drawing Sheets

(51) Int. Cl.
*G08G 1/015* (2006.01)
*G08G 1/017* (2006.01)
*G08G 1/04* (2006.01)
*G08G 1/042* (2006.01)
*G08G 1/14* (2006.01)
*G07B 15/02* (2011.01)
*G01S 17/02* (2006.01)
*G01S 7/481* (2006.01)
*G01S 13/04* (2006.01)

(52) U.S. Cl.
CPC ........... *G07F 17/248* (2013.01); *G08G 1/015* (2013.01); *G08G 1/017* (2013.01); *G08G 1/04* (2013.01); *G08G 1/042* (2013.01); *G08G 1/147* (2013.01); *G01S 7/4813* (2013.01); *G01S 13/04* (2013.01); *G01S 17/026* (2013.01); *Y04S 50/14* (2013.01)

(56) References Cited

U.S. PATENT DOCUMENTS

| | | | |
|---|---|---|---|
| 2,550,433 A | 4/1951 | Tichenor | |
| 2,594,388 A | 4/1952 | Broussard | |
| 2,596,122 A | 5/1952 | Broussard | |
| 2,596,123 A | 5/1952 | Broussard | |
| 2,596,124 A | 5/1952 | Broussard | |
| 2,613,792 A | 10/1952 | Broussard et al. | |
| 2,613,871 A | 10/1952 | Broussard et al. | |
| 2,618,371 A | 11/1952 | Broussard | |
| 2,633,960 A | 4/1953 | Broussard | |
| 2,822,682 A | 2/1958 | Sollenberger | |
| 2,995,230 A | 8/1961 | Moody et al. | |
| 3,199,321 A | 8/1965 | Sollenberger | |
| 3,204,438 A | 9/1965 | Sollenberger | |
| 3,262,540 A | 7/1966 | Sollenberger et al. | |
| 3,272,299 A | 9/1966 | Sollenberger | |
| 3,438,031 A | 4/1969 | Fathauer | |
| 3,519,113 A | 7/1970 | Arzig et al. | |
| 3,565,283 A | 2/1971 | Sciacero et al. | |
| 4,880,406 A | 11/1989 | Van Horn et al. | |
| 5,060,777 A | 10/1991 | Van Horn et al. | |
| 5,109,972 A | 5/1992 | Van Horn et al. | |
| 5,119,916 A | 6/1992 | Carmen et al. | |
| 5,155,614 A | 10/1992 | Carmen et al. | |
| 5,184,707 A | 2/1993 | Van Horn et al. | |
| 5,244,070 A | 9/1993 | Carmen et al. | |
| 5,273,151 A | 12/1993 | Carmen et al. | |
| 5,382,780 A | 1/1995 | Carmen | |
| 5,526,662 A | 6/1996 | Diekhoff et al. | |
| 5,710,743 A * | 1/1998 | Dee | G07F 17/248 194/217 |
| 5,805,083 A | 9/1998 | Sutton et al. | |
| 5,806,651 A | 9/1998 | Carmen et al. | |
| 5,841,369 A | 11/1998 | Sutton et al. | |
| 6,037,880 A | 3/2000 | Manion | |
| 6,111,522 A | 8/2000 | Hiltz et al. | |
| D431,788 S | 10/2000 | Tuxen et al. | |
| 6,195,015 B1 * | 2/2001 | Jacobs | G07F 17/246 340/693.12 |
| 6,230,868 B1 | 5/2001 | Tuxen et al. | |
| 6,243,029 B1 | 6/2001 | Tomer | |
| 6,309,098 B1 | 10/2001 | Wong | |
| 6,312,152 B2 | 11/2001 | Dee et al. | |
| 6,354,425 B1 | 3/2002 | Tuxen et al. | |
| D461,728 S | 8/2002 | Tuxen et al. | |
| 6,505,774 B1 | 1/2003 | Fulcher et al. | |
| 6,874,340 B1 | 4/2005 | Berman | |
| 6,889,899 B2 | 5/2005 | Silberberg | |
| 7,019,670 B2 | 3/2006 | Bahar | |
| 7,237,176 B2 | 6/2007 | Briggs et al. | |
| D575,168 S | 8/2008 | King et al. | |
| D587,141 S | 2/2009 | King et al. | |
| 7,617,120 B2 | 11/2009 | Derasmo et al. | |
| 7,806,248 B2 | 10/2010 | Hunter et al. | |
| 7,825,826 B2 | 11/2010 | Welch | |
| 7,854,310 B2 | 12/2010 | King et al. | |
| RE43,245 E | 3/2012 | Ouimet et al. | |
| D659,557 S | 5/2012 | Jones et al. | |
| 8,193,540 B2 | 6/2012 | Huang et al. | |
| 2002/0074344 A1 | 6/2002 | Long et al. | |
| 2003/0112151 A1 | 6/2003 | Chauvin et al. | |
| 2003/0128136 A1 | 7/2003 | Spier et al. | |
| 2003/0144905 A1 | 7/2003 | Smith | |
| 2004/0160905 A1 | 8/2004 | Bernier et al. | |
| 2005/0168352 A1 | 8/2005 | Tomer | |
| 2006/0173733 A1 | 8/2006 | Fancher | |
| 2006/0255119 A1 | 11/2006 | Marchasin et al. | |
| 2008/0158010 A1 | 7/2008 | Nath et al. | |
| 2008/0245638 A1 | 10/2008 | King et al. | |
| 2009/0026842 A1 | 1/2009 | Hunter et al. | |
| 2009/0095593 A1 | 4/2009 | King et al. | |
| 2009/0099761 A1 | 4/2009 | Davis et al. | |
| 2009/0159674 A1 | 6/2009 | King et al. | |
| 2009/0183966 A1 | 7/2009 | King et al. | |
| 2009/0192950 A1 | 7/2009 | King et al. | |
| 2009/0267732 A1 | 10/2009 | Chauvin et al. | |
| 2009/0287578 A1 | 11/2009 | Paluszek et al. | |
| 2010/0153193 A1 | 6/2010 | Ashby et al. | |
| 2011/0022427 A1 | 1/2011 | Dayan | |
| 2011/0057815 A1 | 3/2011 | King et al. | |
| 2011/0060653 A1 | 3/2011 | King et al. | |
| 2012/0229324 A1 * | 9/2012 | Gow | G01S 13/04 342/27 |
| 2012/0285790 A1 * | 11/2012 | Jones | G07B 15/02 194/217 |

FOREIGN PATENT DOCUMENTS

| | | |
|---|---|---|
| KR | 10-2000-0016671 | 3/2000 |
| KR | 10-2001-0028481 | 4/2001 |
| KR | 10-2008-0041730 | 5/2008 |
| WO | WO 00-59201 | 10/2000 |
| WO | WO 02-063570 | 8/2002 |

OTHER PUBLICATIONS

U.S. Appl. No. 13/468,859, filed May 10, 2012, Jones et al.
U.S. Appl. No. 13/468,867, filed May 10, 2012, Jones et al.
U.S. Appl. No. 13/468,876, filed May 10, 2012, Jones et al.
U.S. Appl. No. 13/468,881, filed May 10, 2012, Jones et al.
PCT/US2012/037205, filed May 10, 2012, Jones et al.
U.S. Appl. No. 29/417,613, filed Apr. 5, 2012, Jones et al.
International Search Report and Written Opinion for International Application No. PCT/US2012/037229, dated Jan. 28, 2013, 14 pages.
International Search Report and Written Opinion for International Application No. PCT/US2012/037205, dated Oct. 4, 2012, 10 pages.
Duncan Solutions, Parking and Enforcement From Start to Finish, Intermec CN50, available at http://www.duncansolutions.com/IntermecCN50.html, believed to be commercially available before May 10, 2010, 2 pages.
Duncan Solutions, Parking and Enforcement From Start to Finish, Motorola MC75, available at http://www.duncansolutions.com/MotorolaMC75.html, believed to be commercially available before May 10, 2010, 1 page.
Duncan Solutions, VM/VS Pay-by-Space Multi-Space Meter Brochure, available at http://www.duncansolutions.com/pdfs/VM.pdf, believed to be commercially available before May 10, 2010, 2 pages.
Duncan Solutions, AutoCITE X3 Handheld Computer Brochure, available at http://www.duncansolutions.com/pdfs/X3.pdf, believed to be commercially available before May 10, 2010, 2 pages.
AutoISSUE Automated Citation Issuance System Brochure, believed to be commercially available before May 10, 2010, 2 pages.
Duncan Solutions, AutoTRAX Meter Management System Brochure, believed to be commercially available before May 10, 2010, 2 pages.

(56) References Cited

OTHER PUBLICATIONS

Duncan Solutions, Eagle CK Single-Space Meter Mechanism Brochure, believed to be commercially available before May 10, 2010, 2 pages.

Duncan Solutions, Eagle 2100 Single-Space Meter Mechanism Brochure, believed to be commercially available before May 10, 2010, 2 pages.

* cited by examiner

SINGLE SPACE ELECTRONIC PARKING METER WITH METER HOUSING MOUNTED VEHICLE SENSOR

CROSS-REFERENCE TO RELATED PATENT APPLICATIONS

This application claims the benefit of and priority to U.S. Provisional Application No. 61/890,955, filed Oct. 15, 2013, which is incorporated herein by reference in its entirety.

BACKGROUND OF THE INVENTION

The present invention relates generally to the field of parking meter systems, devices and methods. The present invention relates specifically to a single space parking meter including a vehicle sensor mounted within the meter housing.

Single space parking meters are typically associated with a single parking space. To utilize an individually metered parking space, a motorist typically inserts money into the parking meter, and the parking meter displays an amount of time related to the amount of money inserted. A multi-space meter typically provides a single payment location for more than one parking spot, and the multi-space meter receives payment and tracks meter time for the multiple parking spots. For either type of meter, the motorist may park at the metered spot for the amount of parking time purchased. When the time on the meter expires, the motorist may move their car or add more time to the meter. If the meter expires and the motorist remains parked at the meter, a parking enforcement officer may issue a parking ticket. A city or other entity may operate a city wide system of single space parking meters and/or multi-space meters.

SUMMARY OF THE INVENTION

One embodiment of the invention relates to a single space parking meter associated with a parking space. The meter includes an outer meter housing including a lower portion and an upper portion, and an inner surface of the upper portion and an inner surface of the lower portion define a cavity. The meter includes an electronic meter mechanism located within the cavity, and the electronic meter mechanism includes a display screen, a payment receiving system, a processor and a user input device. The meter includes a vehicle sensor located within the cavity of the outer meter housing and communicably coupled to the processor of the electronic meter mechanism. The vehicle sensor is configured to detect a vehicle located within the parking space, to generate a signal indicative of the presence of the vehicle within the parking space and to communicate the signal to the processor. The vehicle sensor includes a detection zone, and the vehicle sensor is positioned such that the detection zone is located within the parking space such that the sensor monitors the volume located above the parking space.

Another embodiment of the invention relates to an upper parking meter outer housing component that includes a parking meter cap. The parking meter cap includes an outer surface, an inner surface defining an interior cavity, and a lower edge portion defining an opening into the interior cavity. The lower edge portion is configured to be coupled to a lower housing component of single space meter such that a meter mechanism may be enclosed within the interior cavity of the upper meter dome. The meter cap includes a vehicle sensor coupled to the inner surface of the upper meter dome. The meter cap includes a solar panel coupled to the inner surface of the upper meter dome and configured to supply power to the vehicle sensor.

Another embodiment of the invention relates to a method of upgrading a parking meter that includes an existing meter mechanism located within an outer meter housing having an existing lower portion coupled to a support pole and an existing meter cap coupled to the lower portion. The method includes providing a new meter cap. The new meter cap includes an outer surface, an inner surface defining an interior cavity, and a lower edge portion defining an opening into the interior cavity. The lower edge portion configured to be coupled to the lower portion of the outer meter housing. The new meter cap includes a vehicle sensor coupled to the inner surface and a solar panel coupled to the inner surface and configured to supply power to the vehicle sensor. The method includes decoupling the existing meter cap from the lower portion and coupling the new meter cap to the existing lower portion such that the vehicle sensor faces a parking spot associated with the single space meter.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
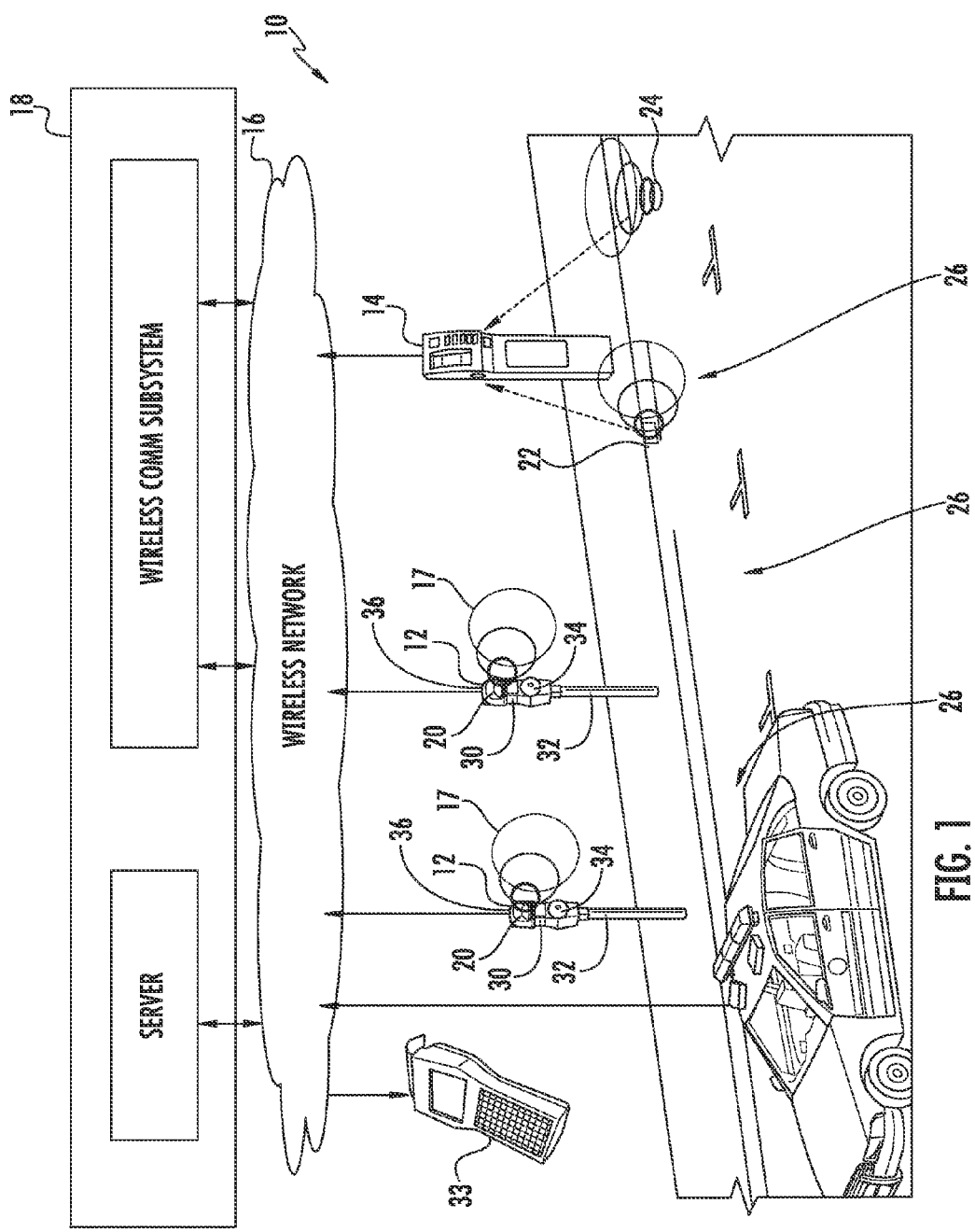
FIG. 1 shows a parking system according to an exemplary embodiment.

Referring generally to the FIGS. a parking meter system including single space parking meters equipped with vehicle sensors is shown according to various exemplary embodiments. As discussed herein, the single space parking meters are equipped with vehicle sensors located within the outer meter housing of the single space meters. In specific embodiments discussed herein, the single space parking meter includes an upper outer housing component, meter cap or meter dome, and the vehicle sensor is coupled to and supported within the meter cap. In some such embodiments, the vehicle sensor is located above the display screen of an electronic meter mechanism that is located within the outer meter housing. In this arrangement, the meter cap of the outer meter housing provides protection to the vehicle sensor (e.g. from the elements, vandalism, etc.) while also providing an appropriate position for the vehicle sensor that allows the sensor to detect a vehicle within the parking space associated with the parking meter. In addition, the positioning of the vehicle sensor within the meter cap discussed herein provides a vehicle sensor inside the meter cap without obscuring the view of the display screen on the electronic parking meter while utilizing the same outer housing unit to protect the vehicle sensor that already protects the meter mechanism. Further, in various embodiments, the positioning of the vehicle sensor within the meter cap discussed herein allows for the installation of vehicle sensor to a single space parking meter by replacing the preexisting upper cap without requiring removal or modification of the lower outer housing component or the support pole for the meter.

In various embodiments discussed herein, the vehicle sensor equipped meter cap is also configured to limit visibility or noticeability of the vehicle sensor within the parking meter housing. In such embodiments, meter cap includes a material or a layer of material that allows the vehicle detecting signal from the vehicle sensor (e.g., an electromagnetic signal) to pass through the meter cap into parking space while also limiting visibility of the vehicle sensor within the meter cap. For example, the upper dome may be formed from a material that is substantially opaque to visual spectrum light, while also being translucent or transparent to the vehicle sensing signal. This arrangement prevents users, motorists or scofflaws from knowing whether a particular parking spot is monitored by a vehicle sensor.

In addition, in various embodiments discussed herein, the meter cap includes a moveable support structure that couples the vehicle sensor to an inner surface of the meter cap assembly. In various embodiments, the moveable support provides for rotation about both the horizontal and vertical axes. The ability to position the vehicle sensor allows the vehicle sensor to be aimed at the parking spot associated with the single space parking meter. The adjustability provided by the support structure discussed herein allows the upper dome assembly to be used in variety of parking space arrangements by allowing the installer to adjust the vehicle sensor as needed to account for variability in the positioning of the parking space relative to the associated single space meter.

Referring to FIG. 1, an exemplary embodiment of a parking system 10 is shown. As shown in FIG. 1, parking system 10 includes one or more single-space parking meters 12, and/or one or more multi-space parking meters 14, a communication network, shown as wireless network 16, and a parking system control system, shown as parking management system 18. In another embodiment, parking system 10 includes single-space parking meters 12 but includes no multi-space parking meters 14.

Both single-space meters 12 and multi-space meter 14 may be configured to communicate with parking management system 18 by directly accessing wireless network 16. In various embodiments, wireless network 16 may be a mobile telephone system, and meters 12 and 14 may access wireless network 16 utilizing standard mobile telephone systems (e.g., GSM, GPRS, EDGE, 2.5G, 3G, 4G, etc.). In other embodiments, meters 12 and 14 are configured to communicated with parking management system 18 via any suitable communication technology, standard, or protocol (e.g., WIFI, IEEE 802.15.4, Bluetooth, ZigBee, etc.). In other embodiments, meters 12 and 14 are configured to communicated with parking management system 18 via wired communication links.

In the embodiment shown in FIG. 1, meters 12 and 14 are configured to communicate parking meter data to parking management system 18 via wireless network 16, and the communicated parking meter data is utilized by parking management system 18 to provide various parking system functionalities. For example, parking management system 18 is a computerized, server system that provides for processing, storage and management of data within parking system 10. In one embodiment shown in FIG. 1, parking management system 18 includes at least one server 19 and wireless communications subsystem 21. Server 19 is configured to store and process parking data associated with a particular parking spot (e.g., current parking space occupancy information, current meter time, vehicle sensor data, information regarding mode of payment, vehicle arrival information, vehicle departure information, parking rates, location information, etc.), including parking data received wirelessly from the meters, to operate the parking system.

Further, server 19 is configured to store and generate data that may be communicated wirelessly to the various components of parking system 10, and in this embodiment, wireless communication hardware 21 is configured to transmit system data or information from server 19 to the appropriate component of the parking system. For example, wireless communications hardware 21 is configured to transmit and meters 12 and 14 are configured to receive information from parking management system 18 via wireless network 16. The system data transmitted from parking management system 18 and received by the parking meters may include parking meter configuration data, parking rate data, time and date data, testing and diagnostic data, parking meter software updates, etc. It should be understood that while the embodiments discussed herein relate primarily to a parking system that communicates with parking management system 18 via a wireless communication network 16, in other embodiments, a wired or a combination wired/wireless communication network may be used to provide communication to parking management system 18. Various additional embodiments of parking system 10 can be found in International Application No. PCT/US2012/037229, filed May 10, 2012, which is incorporated herein by reference in its entirety.

Parking system 10 also includes one or more vehicle sensors, shown as meter housing mounted vehicle sensors 20, curb surface-mount sensor 22 and/or street surface-mount sensor 24. As explained in more detail below, meter housing mounted vehicle sensors 20 provide vehicle sensing functionality while being located within and protected by the same outer housing that protects the meter mechanism. Generally, sensors 20, 22 and 24 are each associated with a single parking space 26 and are configured to detect the presence of a vehicle located in the associated parking space, to detect entry of a vehicle into the associated parking space and/or to detect the exit of a vehicle from the associated parking space. In the embodiment of FIG. 1, a meter housing mounted vehicle sensor 20 is associated with and in communication with each single-space meter 12, and sensors 22 and 24 are associated with and in communication with multi-space meter 14.

Generally, vehicle sensors 20, 22 and 24 are directional sensors (i.e., sensors that only sense in a particular region or direction) and include a targetable detection zone 17. Generally, the vehicle sensors are positioned such that the targetable detection zone 17 is located within the parking space associated with a single space parking meter and is not located in adjacent parking spaces. In this arrangement, detection zone 17 is positioned such that vehicle sensors 20, 22 and 24 monitor the volume located above the parking space associated with the meter. Vehicle sensors 20, 22 and 24 are configured to detect one or more aspect (e.g., presence, entry, exit, etc.) of a vehicle within the parking spot associated with the sensor and to generate a signal indicative of the detected aspect of the vehicle. The generated signal is then communicated from the sensor to a controller associated with the parking meter for the parking spot. In various embodiments, communication from the sensors to the associated meter may be either through wired or wireless communication. The parking meter may execute various functions in response to the detected aspect of the vehicle and may send data to and/or receive data from parking management system 18 in response to the detected aspect of the vehicle. In addition, data generated by the vehicle sensor associated with each meter (e.g., data related to the presence of a vehicle within the space associated with the meter) may be communicated to parking management system 18 via the wireless communications hardware of the meter.

Referring to FIG. 1 parking system 10 include a plurality of single-space meters 12 (e.g., 2, 3, 4, . . . 50, . . . 100, more than 2, more than 10, more than 20, more than 50, more than 100, etc., single-space meters), and may include one or more multi-space parking meters 14. In the embodiment shown, each single-space parking meter 12 includes an outer housing 30 coupled to the ground by a support pole 32 and a vehicle sensor, shown as meter housing mounted vehicle sensor 20. As explained in more detail below an inner meter mechanism (e.g. an electronic meter mechanism) is located within outer housing 30 along with meter housing mounted vehicle sensor 20. As shown, pole 32 includes a lower end coupled to the ground adjacent to and set back from parking space 26 associated with the meter 12 such that there is a distance or space located between pole 32 and parking space 26. It should be understood, that in other embodiments, the vehicle sensing parking meters discussed herein may be a parking meter that services one or more parking spot adjacent to the parking meter.

Outer housing 30 includes a lower housing portion 34 that is directly coupled to pole 32 and an upper housing portion, dome or cap 36 that is coupled to lower housing portion 34. Lower housing portion 34 and cap 36 both include inner surfaces that define a housing cavity, and an inner meter mechanism is located within the cavity. Further, cap 36 is removable from lower housing portion 34 to provide access to the housing cavity and to the inner meter mechanism located within the cavity.

With vehicle sensor 20 mounted within outer housing 30, a space or separation distance is present between vehicle sensor 20 and parking space 26, and vehicle sensor 20 is configured to detect an aspect of a vehicle located within parking space 26 across the space. As shown in FIG. 1, vehicle sensor 20 includes a targetable detection zone 17, and vehicle sensor 20 is positioned within outer housing 30 such that the detection zone 17 of vehicle sensor 20 is located within parking space 26. As explained in more detail below, vehicle sensor 20 may be mounted within outer housing 30 in manner that allows vehicle sensor to be adjusted or aimed to allow detection zone 17 to be directed toward the parking spot 26 associated with a particular single space meter 12.

Physically supporting vehicle sensor 20 within outer housing 30 in close proximity to the meter mechanism and electronics of the single-space meter 12 allows for robust electrical communication between the vehicle sensor and the electronics of the single-space meter. In the embodiment shown, vehicle sensor 20 is communicably coupled with the control circuitry of single-space meter 12 directly via a dedicated hardwired connection. The robust electrical connection permitted by the proximity between the single-space meter electronics and vehicle sensor 20 allows for shared use of certain components. For example, this arrangement allows both single-space meter 12 and vehicle sensor 20 to utilize a single set of wireless communications hardware for communicating with parking management system 18. Specifically, in one embodiment, data generated by vehicle sensor 20 is communicated first to a control system associated with the meter mechanism of single-space meter 12, and then is communicated from the controller of the meter mechanism to parking management system 18 via a wireless communication link.

Referring to FIG. 1, in various embodiments, parking system 10 may also include curb mount vehicle sensors 22 and/or street mount vehicle sensors 24 that communicate parking space usage information wirelessly to a multi-space meter 14 or to parking management system 18. In the embodiment shown in FIG. 1, curb mount vehicle sensors 22 and/or street mount vehicle sensors 24 are stand-alone sensors configured for short relatively short range wireless communication to a multi-space meter 14, and multi-space meter 14 is configured for cellular communication (or other communication) with parking management system 18.

In addition to generating signals indicative of vehicle presence, vehicle entry to the parking spot and vehicle exit from a parking spot, vehicle sensor 20 may be configured to generate other signals related to the parking spot or vehicles located in the parking spot that may be used by parking system 10. For example, vehicle sensor 20 may be configured to generate a signal indicative of a vacant parking spot. In another embodiment, vehicle sensor 20 may be configured to generate a signal indicative of the type of vehicle located in the parking spot. For example, vehicle sensor 20 may be configured to generate a signal indicative of a motorcycle, a signal indicative of a car, a signal indicative of a truck, etc., being present in parking space 26. As another example, vehicle sensor 20 may be configured to generate a signal indicative of a privately owned vehicle located in parking space 26 and a different signal indicative of a publicly-owned or government vehicle located in parking space 26. In other embodiments, vehicle sensor 20 may include an imaging device configured to capture image data of a vehicle located in the parking spot.

Referring back to FIG. 1, parking system 10 may include one or more mobile citation units, shown as handheld unit 33. Handheld unit 33 communicates with parking management system 18 via wireless network 16. In the embodiment shown in FIG. 1, handheld unit 33 includes wireless communications hardware for communication with parking management system 18 via wireless network 16. Handheld unit 33 is carried by parking enforcement personnel and is used to issue citations for parking violations. Handheld unit 33 sends various types of enforcement data (e.g., data indicating issuance of a citation, data related to the type of citation issued, location of parking violation, vehicle identification information, etc.) to parking management system 18 via wireless network 16. Handheld unit 33 also receives various information from parking management system 18. In one embodiment, handheld unit 33 receives information to facilitate the issuances of citations. For example, handheld unit 33 may receive data indicative of the existence and location of expired meters. In one embodiment, handheld unit 33 may receive data regarding which meters within a certain distance from unit 33 are expired. It should be understood that while the figures show a handheld citation unit, other mobile citation units may be used within parking system 10. For example, a mobile citation unit may be mounted within a vehicle driven by enforcement personnel.

In one embodiment, data generated by vehicle sensor 20 associated with each single space meter (e.g., data related to the presence of a vehicle within the space associated with the meter) may be communicated to parking management system 18 via the wireless communications hardware of the meter, and the data related to current space occupancy may be communicated from parking management system 18 to handheld unit 33. In an exemplary embodiment, the data generated by vehicle sensor 20 associated with each parking meter is processed to determine whether a vehicle is currently parked in the meter's parking space when time on the meter expires. If so it is determined that a parking violation has occurred. The single space meter then communicates data indicating that a parking violation has occurred to parking management system 18. Parking management system 18 then stores and communicates the data indicating that a parking violation has occurred to the handheld unit 33. This data then may be used by the enforcement personnel to issue a parking ticket. In one embodiment, following issuance of a parking ticket, data indicating that a parking ticket has been issued is communicated wirelessly from handheld unit 33 to parking management system 18 for processing and storage. In one embodiment, the data indicating that a parking ticket has been issued includes information identifying the vehicle (e.g., VIN, license plate information, etc.) that received the citation.

As can be seen, parking system 10 provides a system utilizing vehicle sensors 20 and wireless communication between the three major components or subsystems (e.g., the meters, the management system, and the citation units). By providing a system in which the components in the field (e.g., the meters and the citation units) communicate wirelessly to parking management system 18, data storage and processing for parking system 10 can be centralized within parking management system 18. Further, parking system 10 allows real-time data from meters system-wide to communicate information to parking management system 18, which in turn allows up to date information regarding parking violations to be communicated to citation units 33 system wide.

Figure 2:
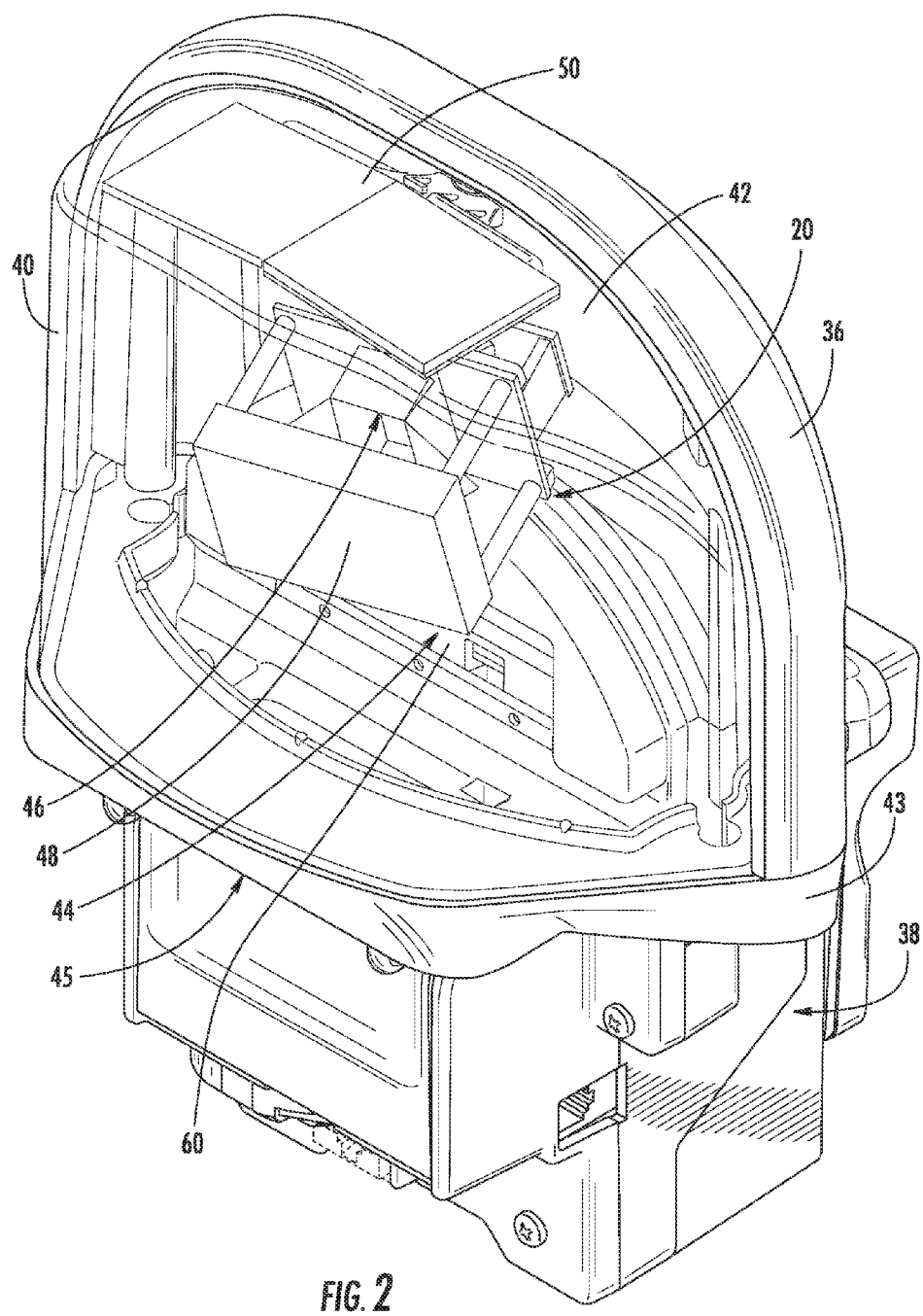
FIG. 2 shows an outer meter cap and an electronic meter mechanism according to an exemplary embodiment.

Referring to FIG. 2, a prospective view of an upper outer meter housing portion, shown as meter or housing cap 36, is shown according to an exemplary embodiment. An electronic meter mechanism 38 is shown located within meter cap 36, and lower outer housing portion 34 is shown removed to better show the meter arrangements discussed herein. As shown in FIG. 2, housing mounted vehicle sensor, shown as vehicle sensor 20, is shown coupled to the inner surface of housing cap 36 and located within the cavity defined by housing cap 36.

Outer housing cap 36 includes a sidewall 40 that generally defines the vertical surfaces of cap 36, and an upper wall 42 that generally defines the horizontal, upward facing surface of cap 36. Sidewall 40 has a lower end, shown as collar 43. Collar 43 defines the lower end of sidewall 40 and is configured to be coupled (e.g., via bolts or other fasteners) to lower outer housing portion 34 (shown in FIG. 1). Collar 43 also defines the opening 45 at the bottom of cap 36 into the interior cavity 44. As shown in FIG. 2, the upper portions of electronic meter mechanism 38 are located within cavity 44.

Sensor 20 includes a sensing element 46. Sensing element 46 is a component or combination of components configured to detect a vehicle within the parking space associated with a single space meter. In one embodiment, sensing element includes an electromagnetic energy transmitter and receiver, and in specific embodiments, sensing element 46 may be a radiofrequency (RF) sensor including a radiofrequency-based sensing element. In such embodiments, sensor 20 may include a dielectric component 48 positioned between sidewall 40 of cap 36 and sensing element 46. In this arrangement dielectric component 48 is also positioned between sensing element 46 and parking space 26 when cap 36 is installed on a meter. In various embodiments, dielectric component 48 acts to focus the electromagnetic signal onto parking space 26. In other embodiments, sensing element 46 may be non-electromagnetic sensing element. In other embodiments, sensing element 46 may be infrared reflectance sensors, ultrasonic sensors, capacitance sensors, proximity sensors, magnetic sensors, magnetic-flux sensors, non-intrusive sensors, radar-based sensors, a low power/broad spectrum radar sensor, time of flight sensors, ranging sensors, etc.

As explained in more detail below, in various embodiments, sensor 20 is connected to meter mechanism 38 via a hard wired communication link. The hardwired communication link couples sensor 20 to the processor of the electronic meter mechanism 38 to allow the processor to utilize the sensor data from sensor 20 as needed for particular applications and to communicate the sensed data wirelessly with parking management system 18. In the embodiments discussed herein, housing cap 36 provides physical protection to both sensor 20 and to the communications link coupling sensor 20 to electronic meter mechanism 38. In various embodiments, electronic meter mechanism 38 is a wirelessly communicating meter mechanism as described in International Application No. PCT/US2012/037229, filed May 10, 2012, which is incorporated herein by reference in its entirety.

Referring to FIG. 2, upper housing cap 36 is equipped with a power supply, shown as solar panel 50, configured to supply power to sensor 20. In various embodiments, solar panel 50 is a dedicated power supply configured to supply power only to sensor 20. As discussed in more detail below, in various embodiments, electronic meter mechanism 38 includes one or more solar panel (or other power supply) separate from solar panel 50 configured to supply power to the components of electronic meter mechanism 38. In such embodiments, by separating power supplies for sensor 20 and electronic meter mechanism 38, efficient power usage and/or improved power supply life may be obtained.

Figure 4:
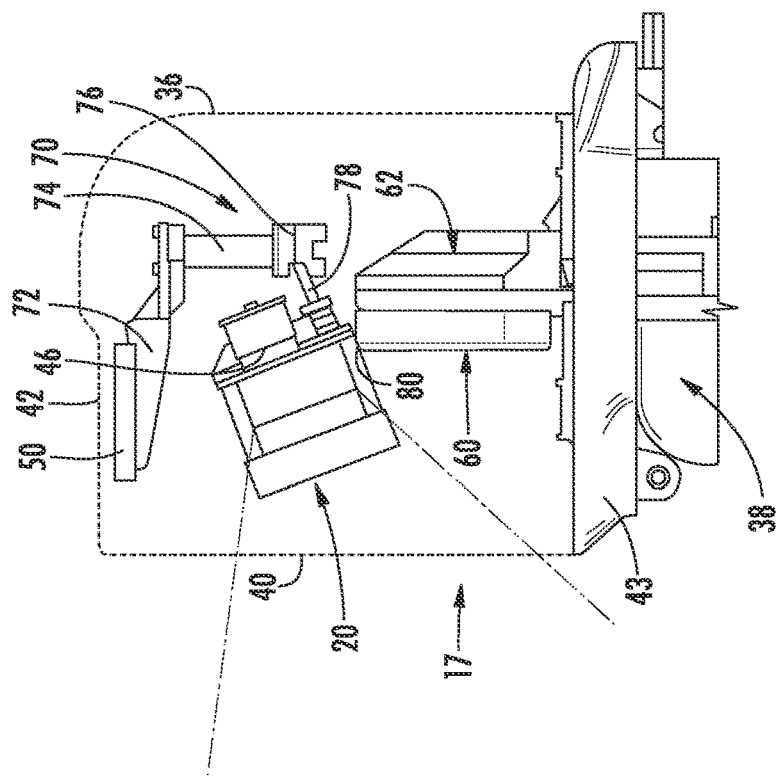
FIG. 4 shows a side view of the outer meter cap and the electronic meter mechanism of FIG. 2 showing a vehicle sensor in a second position according to an exemplary embodiment.
Figure 3:
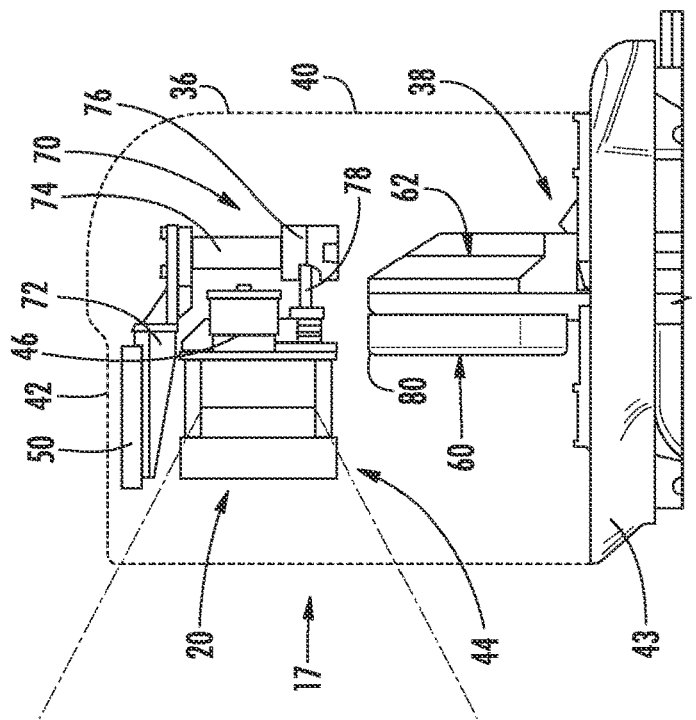
FIG. 3 shows a side view of the outer meter cap and the electronic meter mechanism of FIG. 2 showing a vehicle sensor in a first position according to an exemplary embodiment.

Referring to FIGS. 2-4, sensor 20 is coupled to and supported from the inner surface of upper wall 42 and is located above electronic meter mechanism 38. Solar panel 50 is also coupled to and supported from the inner surface of upper wall 42. As will be appreciated, at least the portion of upper wall 42 of cap 36 above solar panel 50 is formed from a light transmitting (e.g., a translucent or transparent) material such that light is permitted to reach solar panel 50.

The relative positioning of sensor 20 and solar panel 50 are shown best in FIGS. 3 and 4, and in FIGS. 3 and 4, cap 36 is shown schematically in ghost lines to better demonstrate the positioning of components within interior cavity 44 of cap 36. In various embodiments, sensor 20 is located above electronic meter mechanism 38 (e.g., at a higher position as measured along the vertical axis). As shown, electronic meter mechanism 38 includes a rear side and front side, and in the embodiment shown, electronic meter mechanism 38 includes a street facing screen 60 located on the rear side and a sidewalk facing screen 62 located on the front side. In some embodiments, sensor 20 is located above street facing screen 60 and/or above sidewalk facing screen 62 within interior cavity 44 of cap 36. In various embodiments, the lower most portion or surface of sensor 20 is located more than half way of the distance from collar 43 to the uppermost surface of cap 36.

Referring to FIGS. 3 and 4, solar panel 50 is located above electronic meter mechanism 38 and above sensor 20 (e.g., at a higher position measured along the vertical axis). This positioning may increase the light exposure of solar panel 50. In the arrangement shown in FIGS. 3 and 4, sensor 20 is located between screen 60 and solar panel 50 within interior cavity 44 of cap 36. In various embodiments, solar panel 50 is positioned immediately below the inner surface of upper wall 42 of cap 36.

In various embodiments, sensor 20 is supported within cap 36 in a moveable manner to allow sensor 20 to be positioned in a variety of positions within cavity 44 allowing detection zone 17 to be aimed toward the parking spot associated with a particular parking meter. In one embodiment, sensor 20 is rotatable about both the horizontal axis allowing detection zone 17 to positioned up and down and about the vertical axis allowing detection zone 17 to be aimed left or right. The ability to adjust the positioning of sensor 20 within cap 36 allows sensor to be positioned as needed to account for the relative positioning of a particular single space meter to the related parking space.

As shown in FIGS. 3 and 4, a support structure 70 is coupled at one end to sensor 20 and at the other end to the inner surface of cap 36. In this manner support, structure 70 acts to support sensor 20 from the inner surface of upper wall 42 of cap 36. In the embodiment shown, support structure 70 includes a bracket 72 that directly attaches to inner surface of upper wall 42 of cap 36, and in the embodiment shown, bracket 72 is mounted around solar panel 50. A first arm 74 extends downward from bracket 72 spacing sensor 20 below bracket 72. A joint 76 is located at the lower end of arm 74, and a second arm 78 is coupled at a first end to joint 76 and at a second end to sensor 20. In one embodiment, the coupling between second arm 78 and joint 76 is a ball and socket joint that provides movement to aim sensor 20 as discussed above. Joint 76 allows sensor to pivot in both the horizontal direction and in the vertical direction to allowing aiming of sensor 20.

As shown FIG. 4, support structure 70 and sensor 20 are sized and positioned such that an upper edge of electronic meter mechanism 38, shown as edge 80, acts as stop limiting the downward rotation of sensor 20. In such embodiments, when sensor 20 is rotated the maximum distance downward, a lower surface of sensor 20 engages edge 80 preventing further downward rotation of sensor 20. In such embodiments, when sensor 20 is in the position shown in FIG. 4, the detection zone 17 of sensor 20 is positioned such that sensing signal (e.g., RF electromagnetic signal) does not substantially interact with collar 43. Because signal interaction with collar 43 (or other metallic components of the parking meter) might result in vehicle detection errors, the positional stop provided by edge 80 helps to prevent an installer from improperly aiming sensor 20 or from sensor 20 becoming misaligned following installation. In one embodiment, edge 80 limits the downward rotation of sensor 20 to less than 45 degrees, and in another embodiment, edge 80 limits the downward rotation of sensor 20 to less than 30 degrees.

Figure 5:
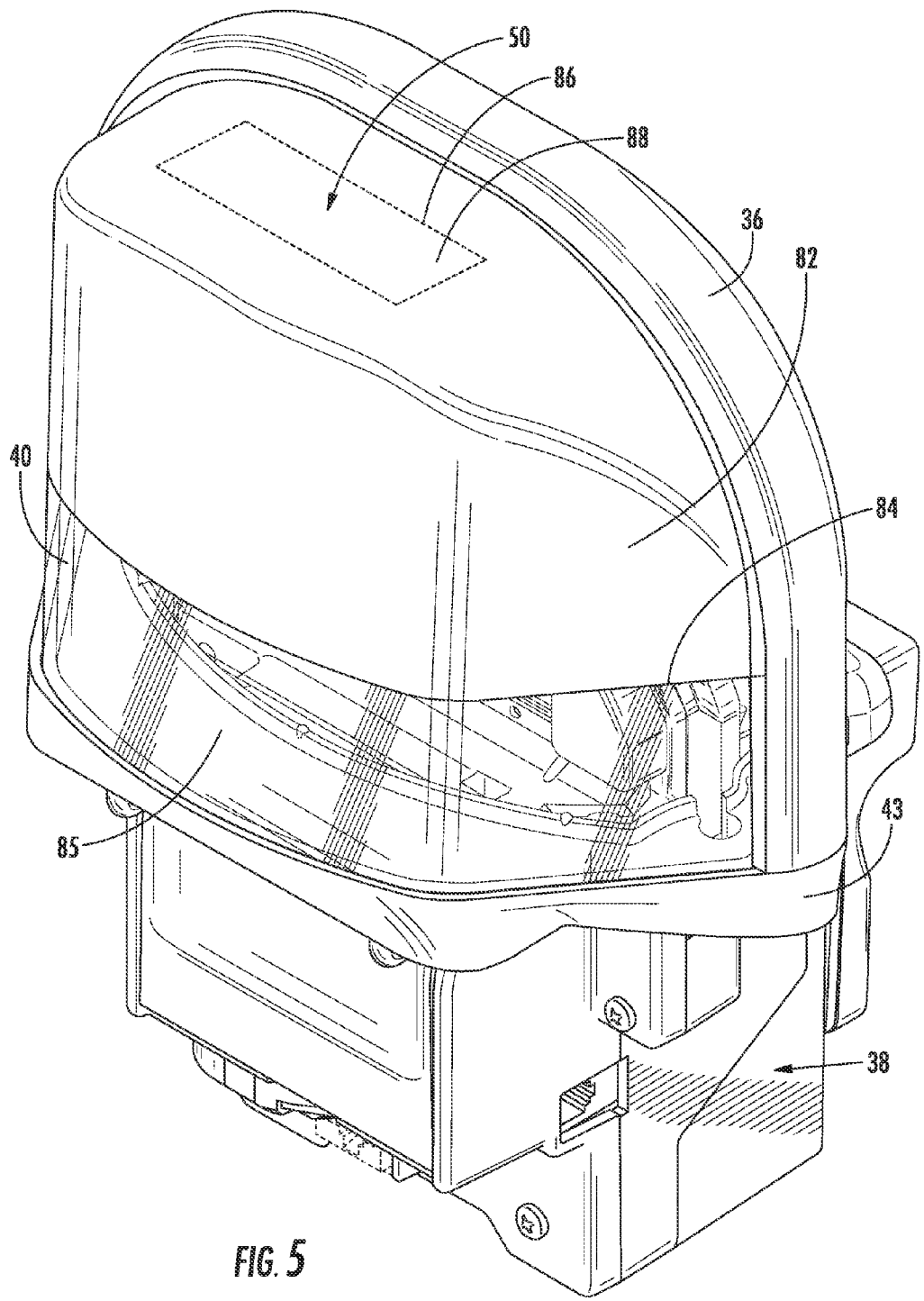
FIG. 5 shows an outer meter cap and an electronic meter mechanism according to another exemplary embodiment.

Referring to FIG. 5, in various embodiments, cap 36 includes a material or layer of material, shown as painted layer 82, that acts to block visibility of sensor 20 from outside of cap 36. In general, painted layer 82 is a layer of paint that allows transmission (e.g., is translucent or transparent) to the signal generated by sensor 20 but that is opaque to visible light. In this manner, painted layer 82 allows sensor 20 to detect vehicles within parking spot 26 while limiting the visibility of sensor 20 to users of single space parking meter 12.

As shown, layer 82 includes a lower edge 84 that is located across sidewall 40 approximately halfway between collar 43 and upper wall 42. In this embodiment, sidewall 40 is formed from a light transmitting material (e.g., a transparent or translucent material, such as transparent plastic, shatter proof glass, etc.), and street facing screen 60 of meter mechanism 38 is visible through the lower, unpainted portion 85 of sidewall 40 because lower edge 84 is positioned above the upper most edge of screen 60. In this arrangement, sensor 20 is not visible through the material of sidewall 40 because it is blocked by paint 82. In various embodiments in which sensor 20 utilizes RF electromagnetic signals, paint 82 may be a polymer based paint having a non-ferromagnetic based colorant. In other embodiments, the portion of the material of sidewall 40 above street facing screen 60 may be formed from an opaque material, and the lower portion in front of street facing screen 60 may be formed from a transparent or translucent material (e.g., plastic, shatter proof glass, etc.).

In addition, the portion of upper wall 42 above solar panel 50 is light transmitting (e.g., transparent or translucent) to allow light to fall on solar panel 50. In the embodiment shown, painted layer 82 includes a second edge 86 located along upper wall 42. As shown, second edge 86 is shaped to substantially conform to the peripheral edge of solar panel 50. Second edge 86 creates a window 88 in upper wall 42 that is positioned above solar panel 50. In this arrangement, light is allowed to reach solar panel 50 while limiting the ability to see sensor 20 through window 88. In other embodiments, upper wall 42 may be formed from an opaque material with a translucent/transparent window 88 located within upper wall 42.

Figure 6:
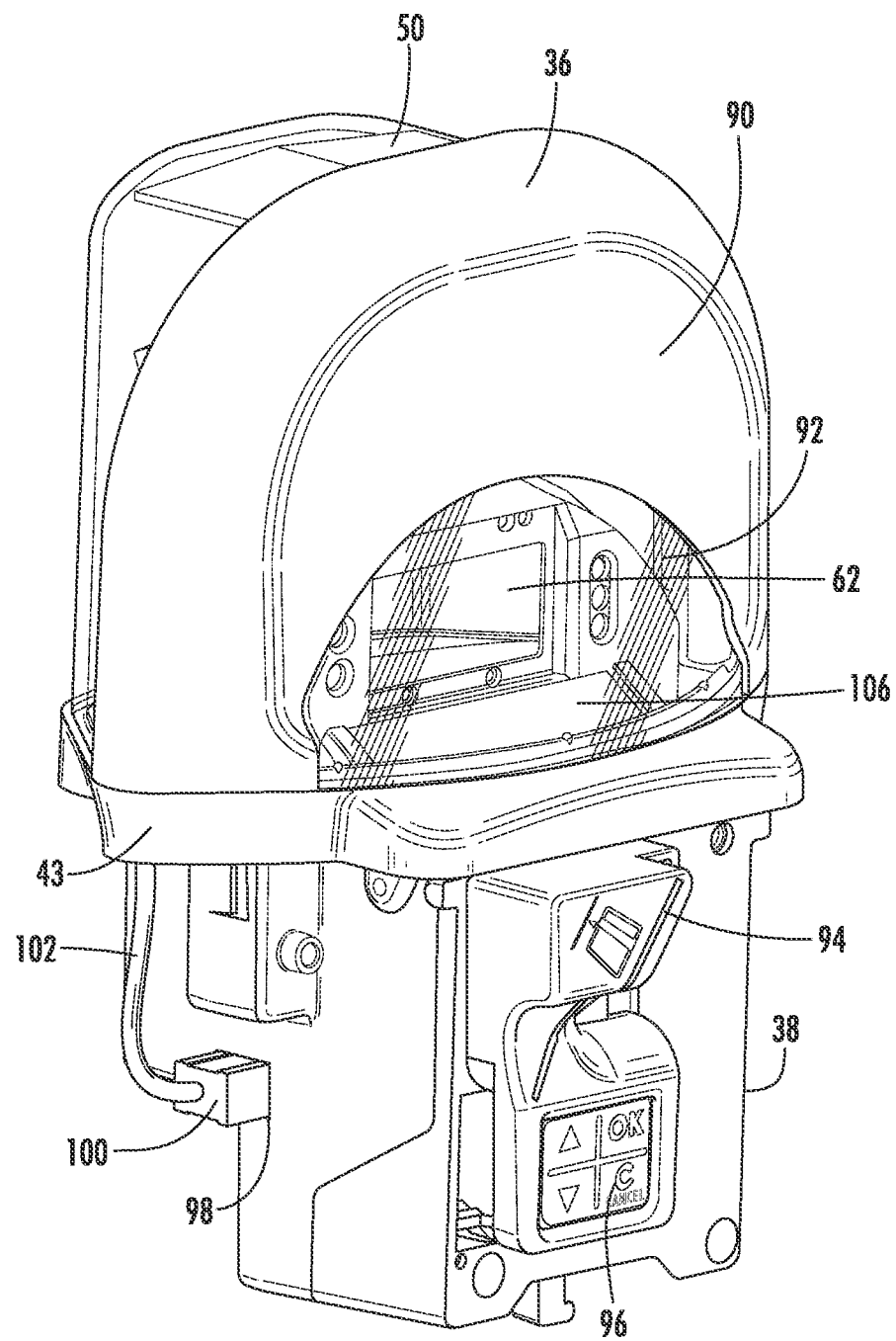
FIG. 6 shows the sidewalk facing side of the outer meter cap and the electronic meter mechanism of FIG. 2 according to an exemplary embodiment.

Referring to FIG. 6, the sidewalk facing side of cap 36 and of meter mechanism 38 are shown according to an exemplary embodiment. Similar to FIG. 2, cap 36 and meter mechanism 38 are shown outside of lower housing portion 34. As shown in FIG. 6, cap 36 includes an opaque face plate 90 on the sidewalk facing side of cap 36. Face plate 90 is generally arc-shaped and extends between opposing edges of collar 43 defining the upper surface of cap 36 on the sidewalk facing side of cap 36. Face plate 90 includes an arc shaped window 92 that allows sidewalk facing display screen 62 to be visible through cap 36. As shown, meter mechanism 38 includes a payment receiving system, shown as a credit card slot 94. In addition, meter mechanism 38 may include a currency reader such as a bill slot or coin slot. Meter mechanism 38 also includes a user input device, shown as keypad 96. Keypad 96 allows the user or motorist to interact with meter mechanism 38 and to pay for parking.

In various embodiments, meter mechanism 38 is a wirelessly communicating electronic meter mechanism configured to communicate sensor data from vehicle sensor 20 to parking management system 18. In some embodiments, meter mechanism 38 is also configured to communicate to parking management system 18 power supply data indicative of power supplied by solar panel 50 to sensor 20. This data may be used for various monitoring or diagnostic purposes, including determining whether a particular solar panel 50 is operating properly or in need of repair. In various embodiments, sensor 20 is coupled to the processor (e.g., microprocessor, processing circuit, etc.) via a hard wired communication link. In one embodiment, meter mechanism 38 includes a port 98 that receives plug 100. A cable 102 couples sensor 20 to port 98 which in turn allows data from sensor 20 to be communicated to the processor of electronic meter mechanism 38. In various embodiments, meter mechanism 38 may be one of the wireless communication meter mechanism embodiments discussed in International Application No. PCT/US2012/037229, filed May 10, 2012, which is incorporated by reference in its entirety.

As shown in FIG. 6, electronic meter mechanism 38 includes a solar panel 106 positioned below display screen 62 and adjacent window 92. In various embodiments, solar panel 106 provides power to the components of electronic meter mechanism 38. In such embodiments, solar panel 50 is a distinct and separate power supply from solar panel 106.

Figure 7:
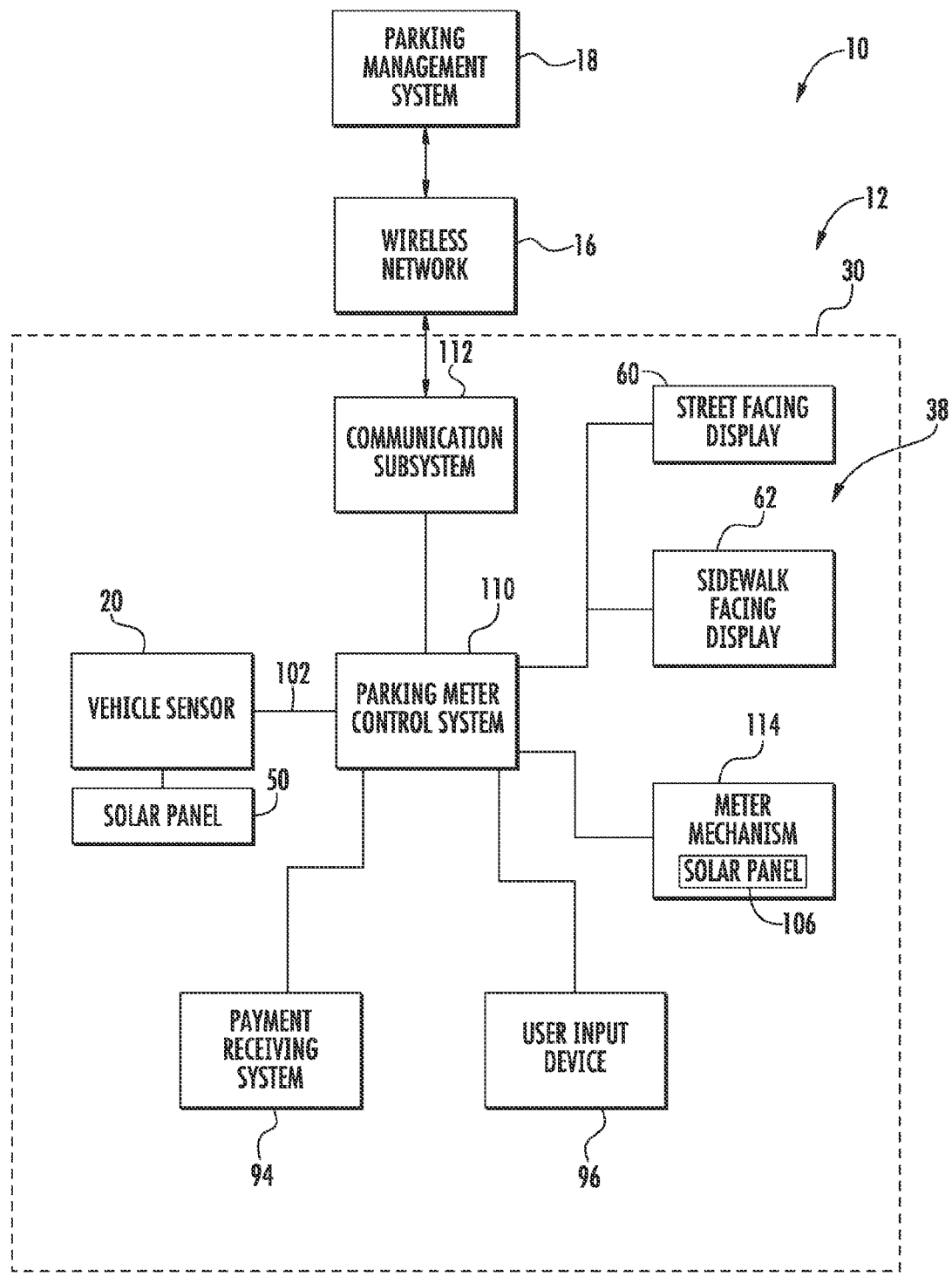
FIG. 7 is a block diagram of a parking system according to an exemplary embodiment.

FIG. 7 shows a block diagram of the parking system 10 and a single space meter 12 according to an exemplary embodiment. Electronic meter mechanism 38 includes a processor, shown as parking meter control system 110, a communication subsystem 112, street facing display 60, sidewalk facing display 62, a power supply 114, a user input device 96, a payment receiving system 94, and vehicle sensor 20. Parking meter control system 110 is communicably coupled to the various components of meter mechanism 38 as shown in FIG. 7. As shown in FIGS. 6 and 7, vehicle sensor 20 is coupled to parking meter control system 110 via physical communication link or cord 102. Parking meter control system 110 may generally be any electronic control unit or circuit suitable to provide the various parking meter functionalities discussed herein. For example control system 110 may include one or more processing circuits having hardware (e.g., processors, memory, communication interfaces, etc.) and/or software configured to control the operation of parking meter 12 as discussed herein.

Communication subsystem 112 includes hardware and/or software for communicating data between parking meter control system 110 and parking management system 18 via wireless network 16. Communication subsystem 112 may be a communication subsystem associated with a single-space parking meter 12 that is configured to communicate data between the associated meter and parking management system 18 via wireless network 16 utilizing standard mobile telephone communication systems (e.g., GSM, GPRS, EDGE, etc.). As noted above, communications subsystem 112 may be configured to utilize other wireless communications standards or protocols or to utilize wired communication for communication with parking management system 18.

Displays 60 and 62 may be configured to display various parking related information (e.g., parking rate, current time and date, time remaining on meter, a meter expired message, user operation instructions, hours of meter operation, meter status information, user information during replacement, maintenance and data extraction processes, etc.) to the user of single-space meter 12. Display 60 and 62 may be a graphical high contrast, low power display. The display may be color or monochrome. Displays 60 and 62 may be an LED display or LCD display.

As noted above, electronic meter mechanism 38 includes a power supply, shown as power supply 114, suitable to power meter mechanism 38. In one embodiment, power supply 114 may include one or more solar cells or solar panels 106 (shown in FIG. 6), and power supply 114 may include one or more self-sustained energy storage devices (e.g., rechargeable batteries, ultracapacitors, etc.). In other embodiments, power supply 114 may be wired AC power supply.

Electronic meter mechanism 38 also includes a user input device 96 that allows the user to interact with and operate the meter. In one embodiment, user input device 96 is a four button keypad (shown in FIG. 6), and the keypad may be configured to provide tactile feedback and/or audible feedback to the user. Electronic meter mechanism 38 also includes a payment receiving system 94 configured to receive and process payment for parking. In one embodiment, payment receiving system 94 includes currency reader (e.g., a money or coin slot and a money detector, a bill slot and bill detector, etc.), a credit-card, mag-strip reader, a smart card reader, and/or a "pay by phone" system.

As shown, vehicle sensor 20 is coupled to parking meter control system 110 via cord 102. Cord 102 allows data from vehicle sensor 20 to be communicated to control system 110. The data generated by vehicle sensor 20 may then be communicated to parking management system 18 by control system 110 utilizing communications subsystem 112. As shown in the embodiment of FIG. 7, solar panel 50 is a dedicated power supply for sensor 20, and is distinct from power supply 114 that supplies power to meter mechanism 38.

Figure 8:
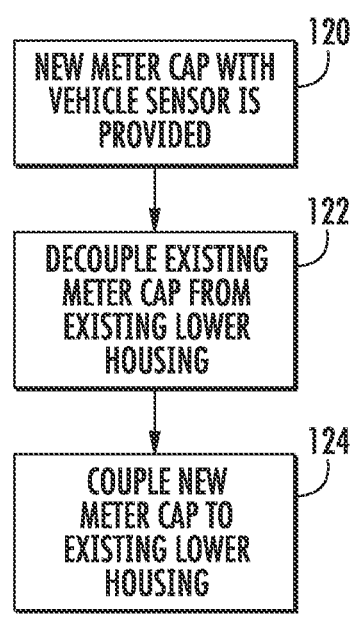
FIG. 8 is a flow diagram showing the process of upgrading a single space parking meter to include a housing mounted vehicle sensor according to an exemplary embodiment.

FIG. 8 shows the process of upgrading a parking meter, such as a single space meter 12, to include a housing mounted vehicle sensor, such as sensor 20, according to an exemplary embodiment. A single space meter to be upgraded via the process of FIG. 8 includes an existing meter mechanism located within an outer meter housing having an existing lower portion coupled to a support pole and an existing meter cap coupled to the lower portion. At step 120, a new meter cap is provided. In one embodiment, the new meter cap is a meter cap including an interior coupled vehicle sensor, and in specific embodiments, the meter cap is meter cap 36 discussed above. At step 122, the existing meter cap from the single space meter is decoupled from the lower portion of the outer housing. At step 124, the new meter cap is coupled to the existing lower portion of the outer housing such that the vehicle sensor faces a parking spot associated with the single space meter. In one embodiment, the new meter cap is coupled to the existing lower portion without modification of the existing lower portion. In another embodiment, the new meter cap is coupled to the existing lower portion without removal of the existing lower portion from a support pole coupled to the ground. In another embodiment, the process includes the step of adjusting the position of the vehicle sensor relative to the new meter cap such that vehicle sensor faces the parking spot following coupling of the new meter cap to the existing lower portion. In one embodiment, the adjusting step is preformed prior to the coupling step 122. In another embodiment, the process includes detecting a vehicle within the parking spot via the vehicle sensor.

Figure 9:
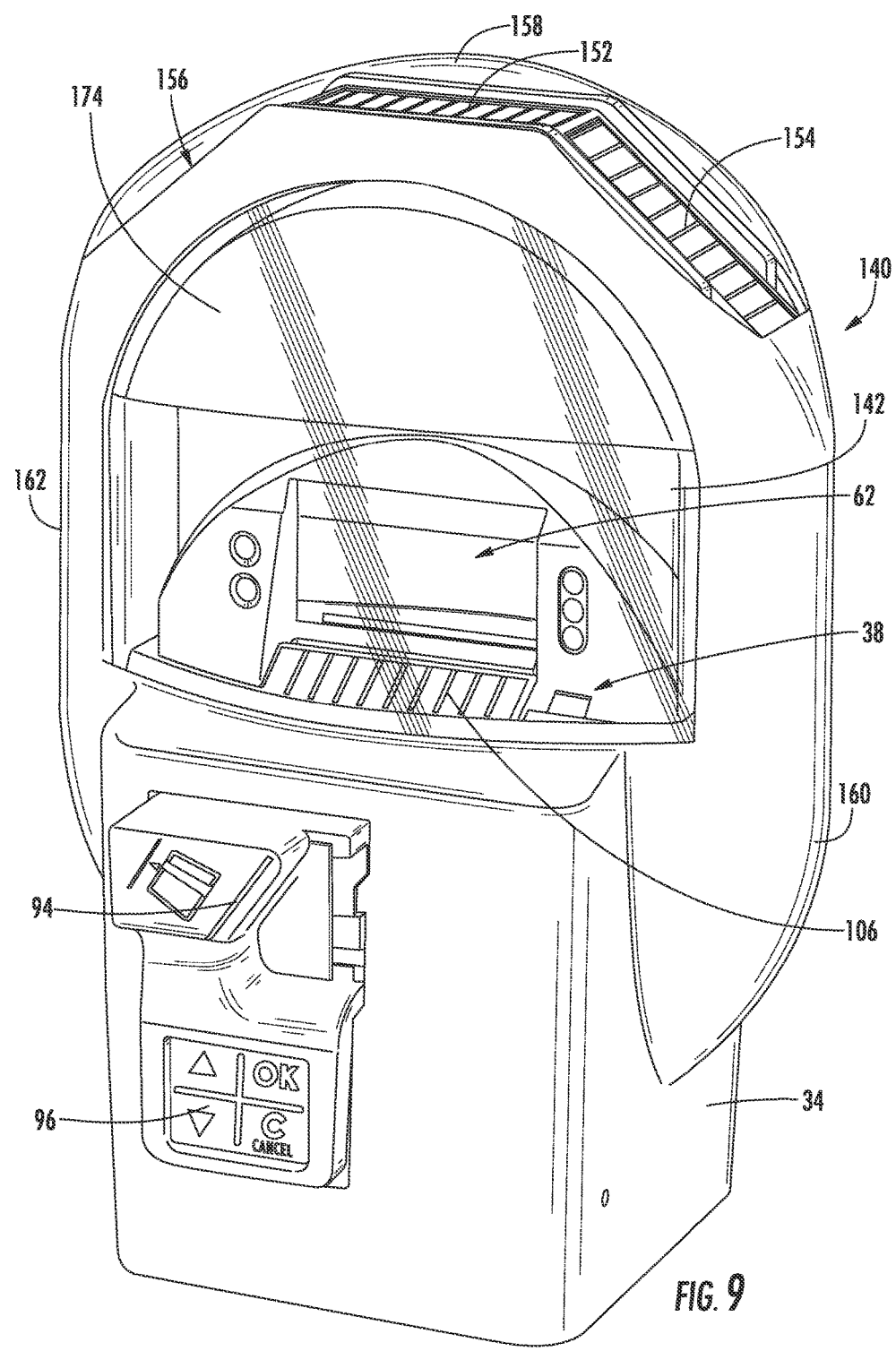
FIG. 9 shows a sidewalk facing side of a single space meter according to an exemplary embodiment.

Referring to FIGS. 9-13, a single space meter including a single space meter upper housing, shown as meter cap 140, and a vehicle sensor is shown according to an exemplary embodiment. Meter cap 140 and the sensor arrangement shown in FIGS. 9-13 are substantially similar to the embodiments discussed above, except as discussed herein. Referring to FIG. 9, meter cap 140 is coupled to lower, outer housing portion 34. Electronic meter mechanism 38 is located within the interior cavity defined by the inner surfaces of meter cap 140 and lower, outer housing portion 34. The payment receiving device, shown as credit card slot 94, and the user input device, shows as keypad 96 extend through lower, outer housing portion 34 such that credit card slot 94 and keypad 96 are accessible by the user.

Figure 10:
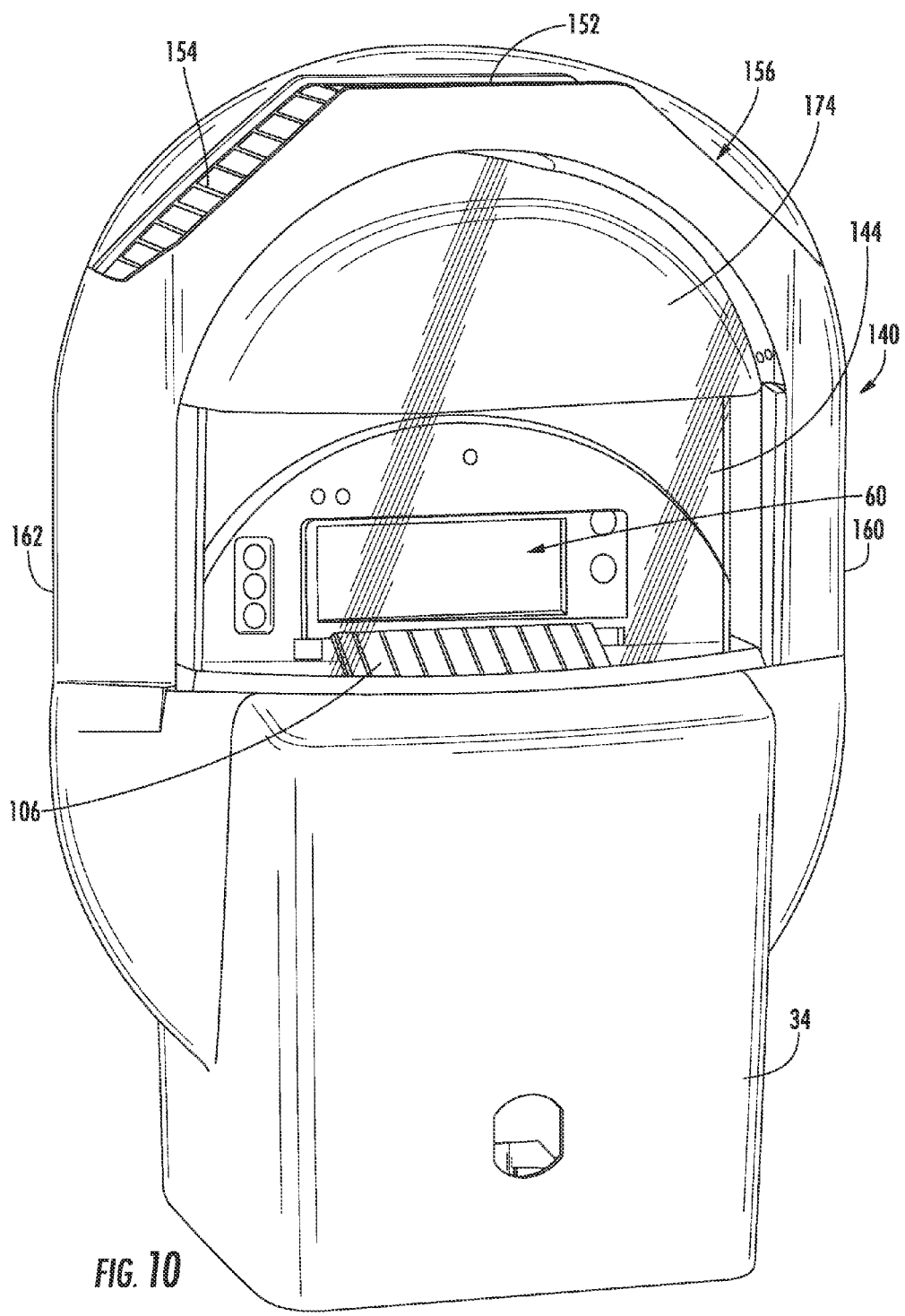
FIG. 10 shows a street facing side of the single space meter of FIG. 9 according to an exemplary embodiment.

Referring to FIGS. 9 and 10, meter cap 140 includes a first window, shown as sidewalk facing window 142, and a second window, shown as street facing window 144. Sidewalk facing display screen 62 of electronic meter mechanism 38 is viewable through a sidewalk facing window 142 of meter cap 140, and street facing display screen 60 of electronic meter mechanism 38 is viewable through a street facing window 144 of meter cap 140.

Meter cap 140 includes a solar panel array 150 that generates power for the vehicle sensor. In various embodiments, solar panel array 150 is a dedicated power source for the vehicle sensor. Solar panel array 150 includes solar panel units 152, 154 and 156. As shown in FIGS. 9 and 10, solar panel unit 152 is a substantially horizontal section of one or more solar panel, and solar panel units 154 and 156 are located on either lateral side of unit 152 and slope downward and away from unit 152. Meter cap 140 includes an upper window 158 that is positioned above solar panel unit 150 that allows light to reach solar panel array 150.

Figure 11:
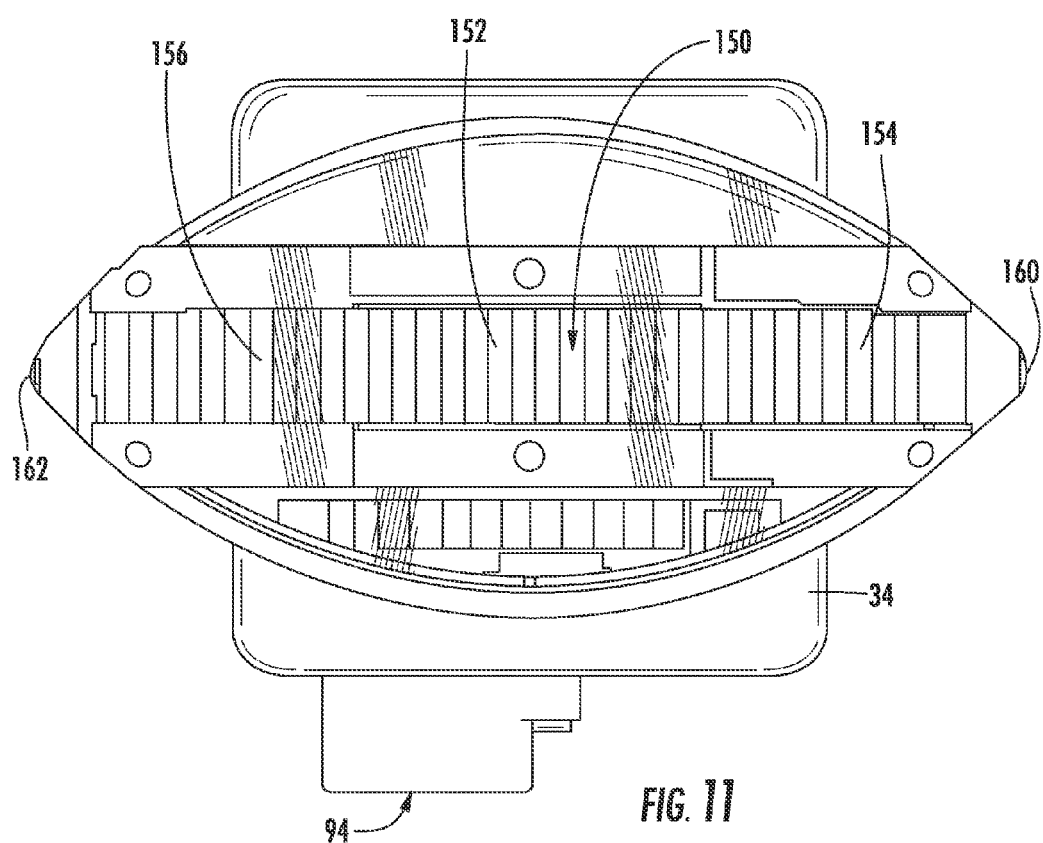
FIG. 11 shows a top view of the single space meter of FIG. 9 according to an exemplary embodiment.

Referring to FIG. 11, solar panel array 150 extends substantially the entire lateral (as used herein lateral relates to the dimension substantially parallel to screens 60 and 62 and/or parallel to the curb) distance between opposing lateral edges 160 and 162 of meter cap 140. In such embodiments, the lateral dimension of solar panel array 150 is greater than the lateral dimension of electronic meter mechanism 38 and/or the lateral dimension of lower housing portion 34. This arrangement and relative sizing of solar panel array 150 allows for sufficient power generation without requiring the depth dimension (as used herein depth relates to the dimension substantially perpendicular to screens 60 and 62 and/or perpendicular to the curb) of meter cap 140 to be increased. In addition, in some embodiments, meter mechanism 38 includes solar panels 106 that provide power to components of the meter mechanism (e.g., the display screen, keypad, payment devices, etc.). In such embodiments, the lateral extension and positioning of solar panel array 150 allows for sufficient power generation for the vehicle sensor without blocking light received by solar panels 106.

Figure 12:
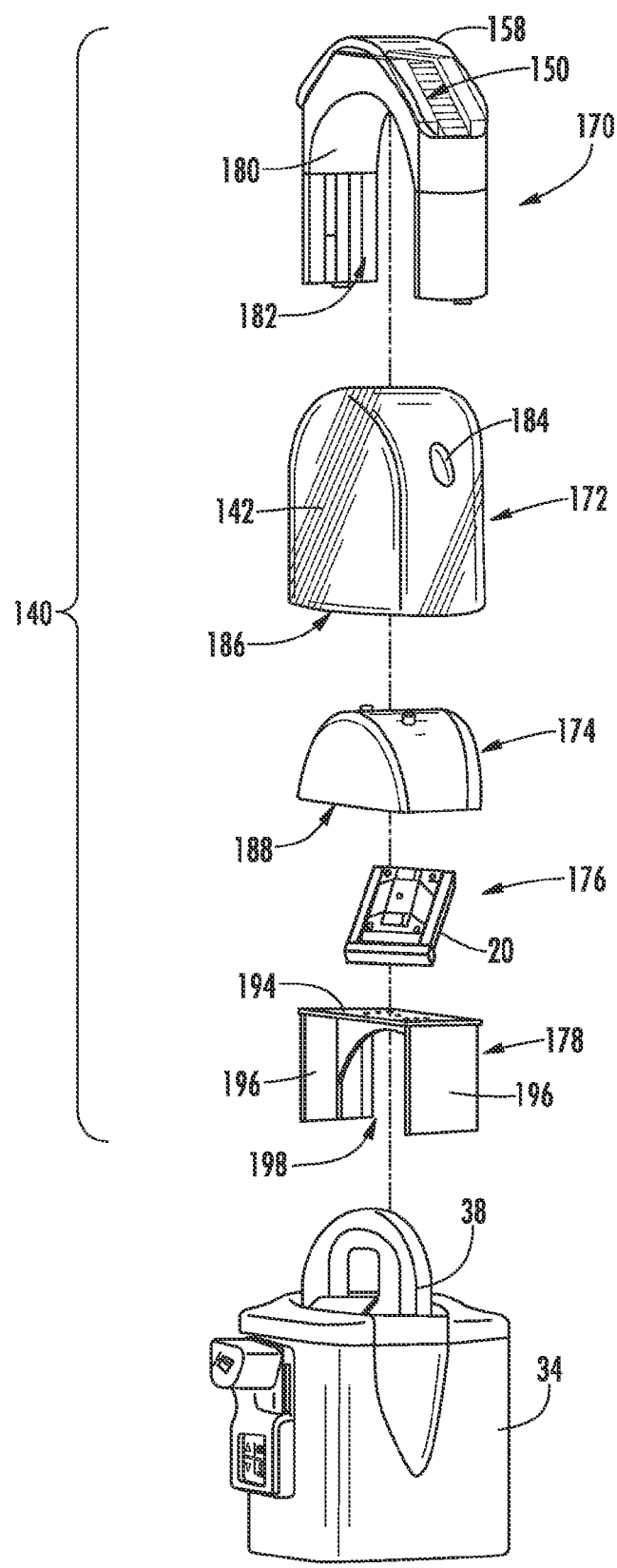
FIG. 12 shows an exploded view the single space meter of FIG. 9 according to an exemplary embodiment.

Referring to FIG. 12, an exploded view of meter cap 140 is shown according to an exemplary embodiment. Meter cap 140 includes a solar array support structure 170, a widow dome 172, a shield 174, a sensor assembly 176 and a sensor support 178. Solar array support structure 170 supports solar panel array 150 and includes upper window 158. In the embodiment shown, solar array support structure 170 is generally an arch shaped component sized to fit over the lower components of meter cap 140. In this arrangement, solar array support structure includes an inner surface 180 that defines a cavity 182 with in which the lower components of meter cap 140 reside following assembly. Window dome 172 is made from a translucent or transparent material that forms windows 142 and 144 following assembly. Window dome 172 includes one or more opening 184 that provides a port for a cable to connect solar panel array 150 to sensor assembly 176. Window dome 172 includes an inner surface that defines an interior cavity 186 within which the lower components of meter cap 140 reside following assembly.

Referring to FIGS. 9, 10 and 12, in various embodiments, meter cap 140 includes a material or layer of material, shown as shield 174, that acts to block visibility of sensor 20 from outside of cap 140. In general, shield 174 is formed from a material that allows transmission (e.g., is translucent or transparent) to the signal generated by sensor 20 of sensor assembly 176 but that is opaque to visible light. In this manner, shield 174 allows sensor 20 to detect vehicles within parking spot 26 while limiting the visibility of sensor 20 to users of single space parking meter 12. In the embodiment shown, shield 174 is generally dome shaped and includes an inner surface that defines an interior cavity 188 within which sensor assembly 176 resides following assembly. In various embodiments, shield 174 is formed from an RF transparent or translucent plastic material that is opaque to visible light. In some such embodiments, the plastic material of shield 174 may include an RF compatible colorant material or additive the colors and results in the opacity of the plastic. In various embodiments, the plastic material of shield 174 may include a small amount of carbon black colorant material below a threshold that allows RF signals to pass through shield 174, and in other embodiments, the plastic material of shield 174 may include nonferromagnetic or non-metallic colorant materials, such as colorants without iron, aluminum or titanium colorants. In some embodiments, shield 174 may be made from a polybutylene terephthalate (PBT) material, and in specific embodiment, may be the Velox brand of PBT.

Figure 13:
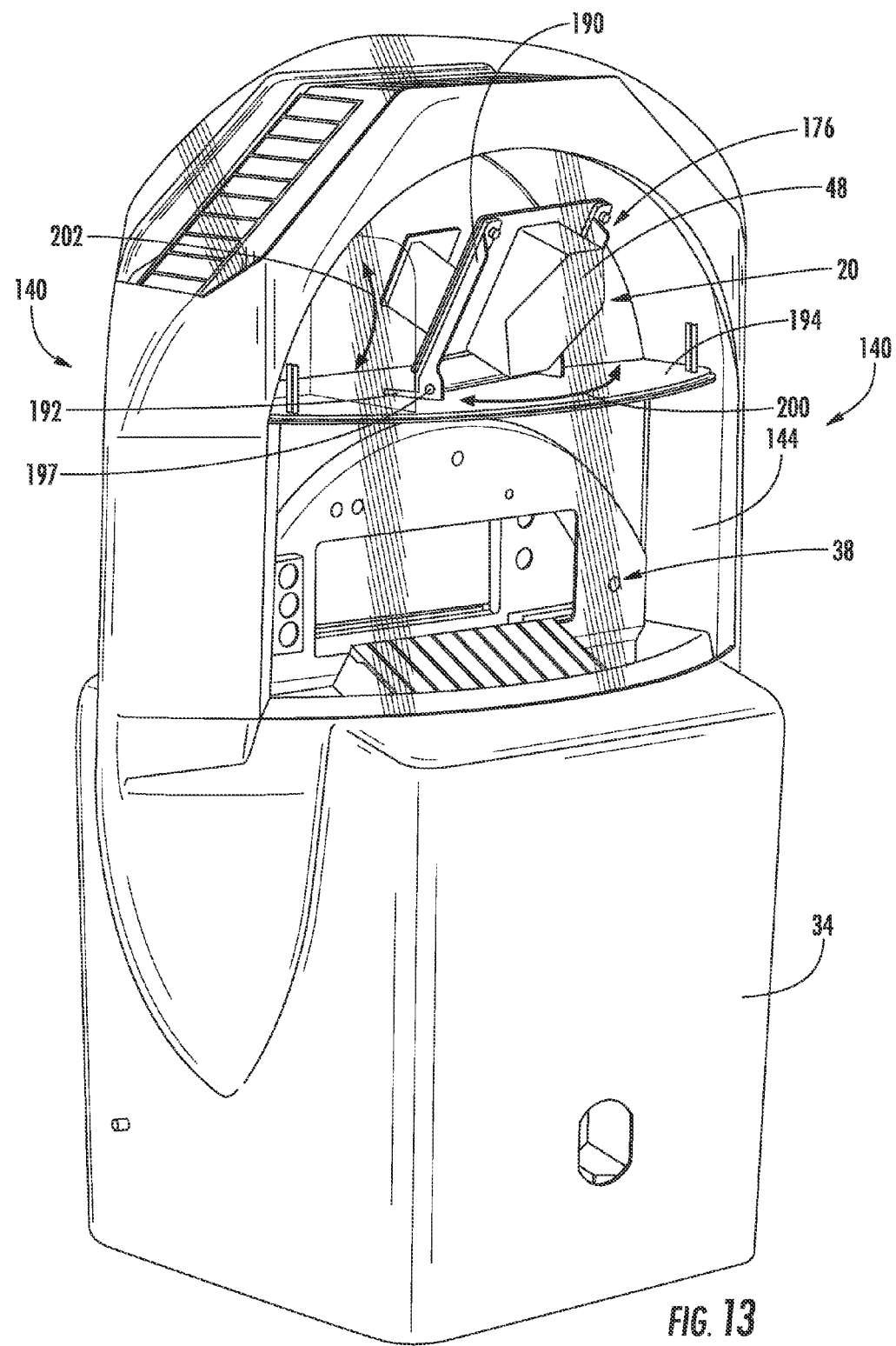
FIG. 13 shows a street facing side of the single space meter of FIG. 9 showing a vehicle sensor according to an exemplary embodiment.

Referring to FIGS. 12 and 13, sensor assembly 176 and sensor support 178 are shown in more detail. It should be noted that FIG. 13 shows meter cap 140 assembled and coupled to lower outer housing 34 with shield 174 removed to show positioning of sensor assembly 176 following assembly. Sensor assembly 176 includes a sensor 20 and a dielectric component 48 in front of the sensor element, as discussed above. Sensor assembly 176 includes a support plate 190 that supports sensor 20 and a generally horizontal base portion 192. Sensor support 178 includes a generally horizontal shelf portion 194 and a pair of legs 196 located on either side of shelf portion 194.

Referring to FIG. 13, following assembly of meter cap 140, sensor assembly 176 is coupled to and supported by shelf portion 194. Sensor assembly 176 can be positioned and coupled to shelf 194 at a variety of angular positions to aim sensor 20 horizontally as indicated by arrow 200. Shelf 194 both supports sensor assembly 176 and also blocks visibility of sensor assembly 176 from a user looking upward into meter cap 140. Base portion 192 may also include a rotatable joint 197 that allows sensor 20 to be aimed vertically as indicated by arrow 202. In addition, as shown in FIG. 12, sensor support 178 includes an inner surface that defines an arch-shaped recess 198, and in the embodiment shown, arch-shaped recess 198 is shaped to substantially match the arched upper surface of meter mechanism 38 above display 60.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. While the current application recites particular combinations of features in the various embodiments discussed herein, various embodiments of the invention relate to any combination of any of the features described herein, and any such combination of features may be claimed in this or future applications. Any of the features, elements, or components of any of the exemplary embodiments discussed above may be claimed alone or in combination with any of the features, elements, or components of any of the other embodiments discussed above.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. In various exemplary embodiments, the relative dimensions, including angles, lengths and radii, as shown in the Figures are to scale. Actual measurements of the Figures will disclose relative dimensions and angles of the various exemplary embodiments. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A single space parking meter system associated with a parking space comprising:
    an outer meter housing comprising a lower portion and an upper portion, wherein an inner surface of the upper portion and an inner surface of the lower portion define a cavity;
    an electronic meter mechanism located generally within the cavity, the electronic meter mechanism comprising a display screen, a payment receiving system, a processor and a user input device;
    a vehicle sensor communicably coupled the electronic meter mechanism, the vehicle sensor configured to detect a vehicle located within a parking space, and configured to generate a signal indicative of the presence of the vehicle within the parking space and to communicate the signal to the processor, the vehicle sensor having a detection zone and being positioned such that the detection zone is located generally within the parking space such that the vehicle sensor monitors a volume located above the parking space; and
    a support structure coupled to the vehicle sensor, the support structure allowing the vehicle sensor to be pointed at one of an angle offset from the primary direction of a rear face of the parking meter and an angle offset from a normal angle to a rear face of the parking meter.

2. The single space parking meter system of claim 1 wherein the vehicle sensor is one of a radar sensor and a broad spectrum radar sensor with occupied or necessary bandwidths greater than 10 MHz.

3. The single space parking meter system of claim 1 wherein the vehicle sensor is supported from a surface of the outer meter housing.

4. The single space parking meter system of claim 3 wherein the vehicle sensor transmits a non-visible spectrum electromagnetic signal to detect the vehicle located within the parking spot through a material that allows transmission of the non-visible spectrum electromagnetic signal.

5. The single space parking meter system of claim 4 wherein the material is selected to transmit microwave signals.

6. The single space parking meter system of claim 4 wherein a layer of the material is a separator located between the vehicle sensor and the upper portion of the outer meter housing.

7. The single space parking meter system of claim 1 further comprising: the support structure being coupled to a vehicle sensor mounting mechanism, the support structure comprising a joint configured to adjust the vehicle sensor allowing the vehicle sensor to be aimed such that the detection zone of the vehicle sensor is located within the parking space.

8. The single space parking meter system of claim 1 further comprising:
    at least one solar panel configured to generate power for at least the display screen, the processor and the payment receiving system of the electronic meter mechanism, and the vehicle sensor.

9. The single space parking meter system of claim 8 wherein the electronic meter mechanism comprises an inner housing and the processor, the display screen, the user input device, the payment receiving system and a first solar panel of the at least one solar panel are supported by at least one of the inner housing and the outer meter housing.

10. The single space parking meter system of claim 9 wherein a second solar panel of the at least one solar panel is coupled to and supported by the upper portion of the outer meter housing at a position above the display screen of the electronic meter mechanism, and the vehicle sensor is located above the display screen of the electronic meter mechanism and below the second solar panel.

11. The single space parking meter system of claim 1 wherein the electronic meter mechanism comprises a front side and a rear side, wherein the user input device, payment receiving system and display screen are located on the front side of the electronic meter mechanism and the vehicle sensor faces away from the rear side of the electronic meter mechanism.

12. The single space meter system of claim 1 wherein the electronic meter mechanism further comprises wireless communications hardware communicably coupled to the processor and configured to wirelessly communicate data from the electronic meter mechanism to a parking management system, and wherein the data wirelessly communicated by the wireless communications hardware comprises data generated by the vehicle sensor, and the payment receiving system comprises a currency reader comprising a slot for receiving currency and a credit card mag-strip reader.

13. A single space parking meter system associated with a parking space comprising:
- an outer meter housing comprising a lower portion and an upper portion, wherein an inner surface of the upper portion and an inner surface of the lower portion define a cavity; an electronic meter mechanism located generally within the cavity, the electronic meter mechanism comprising a display screen, a payment receiving system, a processor and a user input device;
- a vehicle sensor communicably coupled to the electronic meter mechanism, the vehicle sensor configured to detect a vehicle located within a parking space, and configured to generate a signal indicative of the presence of the vehicle within the parking space and to communicate the signal to the processor, the vehicle sensor having a detection zone and being positioned such that the detection zone is located generally within the parking space such that the vehicle sensor monitors a volume located above the parking space; and
- a support structure coupled to the vehicle sensor, the support structure allowing the vehicle sensor to be pointed at an angle offset from the primary direction of a rear face of the parking meter;
- wherein the vehicle sensor is one of a radar sensor and a broad spectrum radar sensor with occupied or necessary bandwidths greater than 10 MHz.

14. The single space parking meter system of claim 13, further comprising:
- the support structure being coupled to a vehicle sensor mounting mechanism, the support structure comprising a joint configured to adjust the vehicle sensor to allow the vehicle sensor to be aimed such that the detection zone of the vehicle sensor is located within the parking space.

15. A single space parking meter system associated with a parking space comprising:
- an outer meter housing comprising a lower portion and an upper portion, wherein an inner surface of the upper portion and an inner surface of the lower portion define a cavity; an electronic meter mechanism located generally within the cavity, the electronic meter mechanism comprising a display screen, a payment receiving system, a processor and a user input device;
- a vehicle sensor communicably coupled to the electronic meter mechanism, the vehicle sensor configured to detect a vehicle located within a parking space, and configured to generate a signal indicative of the presence of the vehicle within the parking space and to communicate the signal to the processor, the vehicle sensor having a detection zone and being positioned such that the detection zone is located generally within the parking space such that the vehicle sensor monitors a volume located above the parking space; and
- a support structure coupled to the vehicle sensor, the support structure allowing the vehicle sensor to be pointed at an angle offset from a normal angle to a rear face of the parking meter;
- wherein the vehicle sensor is one of a radar sensor and a broad spectrum radar sensor with occupied or necessary bandwidths greater than 10 MHz.

16. The single space parking meter system of claim 15, further comprising:
- the support structure being coupled to a vehicle sensor mounting mechanism, the support structure comprising a joint configured to adjust the vehicle sensor to allow the vehicle sensor to be aimed such that the detection zone of the vehicle sensor is located within the parking space.

* * * * *